(12) United States Patent
Lu et al.

(10) Patent No.: US 9,484,578 B2
(45) Date of Patent: Nov. 1, 2016

(54) METHOD FOR THE SYNTHESIS OF METAL CYANOMETALLATES

(71) Applicant: Sharp Laboratories of America, Inc., Camas, WA (US)

(72) Inventors: Yuhao Lu, Vancouver, WA (US); Long Wang, Vancouver, WA (US); Sean Vail, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 272 days.

(21) Appl. No.: 14/289,746

(22) Filed: May 29, 2014

(65) Prior Publication Data

US 2014/0264160 A1      Sep. 18, 2014

Related U.S. Application Data

(63) Continuation-in-part of application No. 14/271,498, filed on May 7, 2014, now Pat. No. 9,419,278, which is a continuation-in-part of application No. 14/230,882, filed on Mar. 31, 2014, which is a (Continued)

(51) Int. Cl.
*H01M 4/58* (2010.01)
*C01C 3/11* (2006.01)
*C01C 3/12* (2006.01)

(52) U.S. Cl.
CPC ............... *H01M 4/58* (2013.01); *C01C 3/11* (2013.01); *C01C 3/12* (2013.01); *C01P 2002/50* (2013.01)

(58) Field of Classification Search
CPC ...... H01M 4/58; C01P 2002/50; C01C 3/12; C01C 3/11
See application file for complete search history.

(56) References Cited

U.S. PATENT DOCUMENTS

2012/0328936 A1* 12/2012 Wessells ............. H01M 10/054
                                                                429/188

OTHER PUBLICATIONS

V.D. Neff, Some performance characteristics of a Prussian Blue battery, Journal of Electrochemical Society, 132 (1985) 1382-1384.
N. Imanishi et al., Lithium intercalation behavior into iron cyanide complex as positive electrode of lithiumsecondary battery, Journal of Power Sources, 79 (1999) 215-219.
Y. Lu, L. Wang, J. Cheng, J.B. Goodenough, Prussian blue: a new framework for sodium batteries, Chemistry Communication, 48(2012)6544-6546.

(Continued)

*Primary Examiner* — Monique Wills
(74) *Attorney, Agent, or Firm* — Law Office of Gerald Maliszewski; Gerald Maliszewski

(57) ABSTRACT

Methods are presented for synthesizing metal cyanometallate (MCM). A first method provides a first solution of $A_X M2_Y(CN)_Z$, to which a second solution including M1 is dropwise added. As a result, a precipitate is formed of $A_N M1_P M2_Q(CN)_R \cdot FH_2O$, where N is in the range of 1 to 4. A second method for synthesizing MCM provides a first solution of $M2_C(CN)_B$, which is dropwise added to a second solution including M1. As a result, a precipitate is formed of $M1[M2_S(CN)_G]_{1/T} \cdot DH_2O$, where S/T is greater than or equal to 0.8. Low vacancy MCM materials are also presented.

21 Claims, 3 Drawing Sheets

Related U.S. Application Data continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, which is a continuation-in-part of application No. 14/067,038, filed on Oct. 30, 2013, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(56) References Cited

OTHER PUBLICATIONS

L. Wang, Y. Lu, J. Liu, M. Xu, J. Cheng, D. Zhang, J.B. Goodenough, A superior low-cost cathode for a Na-ion battery, Angew. Chem. Int. Ed., 52(2013)1964-1967.

A. Eftekhari, Potassium secondary cell based on Prussian blue cathode, J. Power Sources, 126 (2004) 221-228.

C.D. Wessells, R.A. Huggins, Y. Cui, Copper hexacyanoferrate battery electrodes with long cycle life and high power, Nature Communication, 2(2011) 550.

C.D. Wessells et al., Nickel hexacyanoferrate nanoparticle electrodes for aqueous sodium and potassium ion batteries. Nano Lettetter, 11(2011) 5421-5425.

C.D. Wessells et al., The effect of insertion species on nanostructured open framework hexacyanoferrate battery electrode, J. Electrochem. Soc., 159(2012) A98-A103.

T.Matsuda, M. Takachu, Y. Moritomo, A sodium manganese ferrocyanide thin film for Na-ion batteries, Chemical Communications, DOI:10 1039/C3CC38839E.

S.-H. Yu et al., Iron hexacyanoferrate nanoparticles as cathode materials for lithium and sodium rechargeable batteries, ECS Electrochemistry Letters, 2(2013)A39-A41.

X. Wu, W. Den, J. Qian, et al., Single-crystal FeFe(CN)6 nanoparticles: a high capacity and high rate cathode for Na-ion batteries, J. Mater. Chem. A., 1(2013)10130-10134.

* cited by examiner

CARBON   NITROGEN

CARBON   NITROGEN

METHOD FOR THE SYNTHESIS OF METAL CYANOMETALLATES

RELATED APPLICATIONS

This application is a Continuation-in-Part of an application entitled, RECHARGEABLE METAL-ION BATTERY WITH NON-AQUEOUS HYBRID ION ELECTROLYTE, invented by Yuhao Lu et al, Ser. No. 14/271,498, filed May 7, 2014, which is a Continuation-in-Part of an application entitled, REACTIVE SEPARATOR FOR A METAL-ION BATTERY, invented by Long Wang et al, Ser. No. 14/230,882, filed Mar. 31, 2014, which is a Continuation-in-Part of an application entitled, NASICON-POLYMER ELECTROLYTE STRUCTURE, invented by Long Wang et al, Ser. No. 14/198,755, filed Mar. 6, 2014, which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014, which is a Continuation-in-Part of an application entitled, BATTERY ANODE WITH PRELOADED METALS, invented by Long Wang et al, Ser. No. 14/198,663, filed Mar. 6, 2014, which is a Continuation-in-Part of an application entitled, METAL BATTERY ELECTRODE WITH PYROLYZED COATING, invented by Yuhao Lu et al, Ser. No. 14/193,782, filed Feb. 28, 2014, which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014, which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014, This application is a Continuation-in-Part of an application entitled, SODIUM IRON(H)-HEXACYANOFERRATE(H) BATTERY ELECTRODE AND SYNTHESIS METHOD, invented by Yuhao Lu et al, Ser. No. 14/067,038, filed Oct. 30, 2013, which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013, which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013, which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013, which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013, which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan 29, 2013, which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012, Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012, which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012, which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297awarded by DOE. The Government has certain rights in this invention.

BACKGROUND OF THE INVENTION

1. Field of the Invention

This invention generally relates to electrochemical cells and, more particularly, to a method for synthesizing metal cyanometallates (MCMs) for use in battery electrodes.

2. Description of the Related Art

The rechargeable lithium battery has triggered a portable electronic devices revolution due to their high power density, long cycling life, and environmental compatibility. The rechargeable lithium battery consists of a cathode (positive electrode) and an anode (negative electrode), separated by a lithium-ion ($Li^+$) permeable membrane. A solution or polymer containing lithium-ions is also used in the battery to permit the lithium-ions to "rock" back and forth between the positive and negative electrode freely. The positive materials are mainly transition-metal oxides such as lithium cobalt oxide ($LiCoO_2$), lithium manganese oxide ($LiMn_2O_4$), lithium iron phosphate ($LiFePO_4$), and their derivatives. Lithium-ions can move in their interstitial space freely and reversibly. The negative electrode materials can be made from lithium-metal, alloys, and carbonaceous materials. When the rechargeable lithium battery does not include a metallic electrode, it is called as the lithium-ion battery. In the discharge process of the lithium-ion battery, $Li^+$-ions are extracted from the negative electrode and inserted into the positive electrode. Meanwhile, electrons pass through an external circuit from the negative electrode to the positive electrode and generate electric power. In the charge process, ions and electrons move in the reverse direction and return to their original places.

Although lithium-ion batteries are widely used, lithium demand and its limited reserve surge its cost, which renders problematic the continuing application of lithium-ion batteries on a large scale. Therefore, a low-cost rechargeable battery alternative is needed. Under these circumstances, sodium-ion batteries are being investigated, because sodium has very similar properties to lithium, but a cheaper cost. Like lithium-ion batteries, sodium-ion ($Na^+$) batteries need $Na^+$-host materials as their electrode. Much effort has been expended to directly duplicate $Li^+$-host structures as the $Na^+$-host electrode materials for the sodium-ion batteries. For example, $NaCoO_2$, $NaMnO_2$, and $Na_{0.85}Li_{0.17}$ $Ni_{0.21}Mn_{0.64}O_2$, having the similar layered-structure as $LiCoO_2$, were developed for sodium-ion batteries. Similarly, $Co_3O_4$ with a Spinel structure, $Na_3V_2(PO_4)_3$ with a NASI-CON ($Na_3Zr_2PSi_2O_{12}$) structure, and $NaFePO_4$ with an Olivine structure were employed in sodium batteries. In addition, sodium fluorophosphates, such as $Na_2PO_4F$, $NaVPO_4F$ and $Na_{1.5}VOPO_4F_{0.5}$, were also used as the positive electrode in sodium batteries.

However, it is impractical to copy the structures of $Li^+$-host compounds to $Na^+$ or potassium-ion ($Ka^+$)-host compounds. Sodium and potassium ions are much larger than lithium ions, and severely distort the structures of the $Li^+$-host compounds. Thus, it is very important to develop new $Na^+/K^+$-host materials with large a interstitial space in which sodium/potassium-ions can easily and reversibly move. $Na^+/K^+$-ions have been observed to intercalate into metal cyanide compounds. Transition metal hexacyanoferrates (TMHCFs) with large interstitial spaces have been investigated as cathode materials for rechargeable lithium-ion batteries [1,2], sodium-ion batteries [3,4], and potassium-ion batteries [5]. With an aqueous electrolyte containing the proper alkali-ions or ammonium-ions, copper and nickel hexacyanoferrates [(Cu,Ni)-HCFs] demonstrated a robust cycling life with 83% capacity retention after 40,000 cycles at a charge/discharge current of 17 C (1 C=150 milliamp hours per gram (mAh/g)) [6-8]. in spite of this, the materials demonstrated low capacities and energy densities because (1) only one sodium-ion can be inserted/extracted into/from per Cu—HCF or Ni—HCF formula, and (2) these TMHCF electrodes must be operated below 1.23 V due to the water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction. To compensate for these shortcomings, manganese hexacyanoferrate (Mn—HCF) and iron hexacyanoferrate Fe—HCF) were used as cathode materials in a non-aqueous electrolyte [9, 10]. When assembled with a sodium-metal anode. Mn—HCF and Fe—HCF electrodes cycled between 2.0V and 4.2 V delivered capacities ~110 mAh/g.

FIG. 1 is a schematic diagram of the framework of ideal $A_xM_1M_2(CN)_z$ (prior art). In general, the metal cyanometallates (MCMs) have the general formula of $A_xM1_mM2_n(CN)_z$ that results in an open framework as shown in the figure. The open framework structure of the transition metal MCM facilitates both rapid and reversible intercalation processes for alkali and alkaline ions ($A_x$). The MCM capacity is determined by the available A-sites in the compounds into which the alkali and alkaline ions can be intercalated reversibly within the range of working voltages. From the electric neutrality point of view, the valences of M1 and M2 mainly contribute to the amount of the available A-sites. For example, 2 sodium-ions can be intercalated/deintercalated into/from $Na_2MnFe(CN)_6$ between 2-4V vs. Na°, because the valences of Mn- and Fe-ions can changed between +2 and +3, and its theoretical capacity is 171 mAh/g. However, for $Na_2FeCu(CN)_6$, only one sodium-ion per formula can be reversibly inserted/removed into/from the compound because the valence of Cu-ion cannot change between 2-4V vs. Na°. Its theoretical capacity is 83 mAh/g. In addition, it is inevitable that water and M1/M2-ions remain in the A-sites during synthesis because of the large interstitial spaces of the MCM compounds. For the purpose of increasing the sodium-ion concentration in $Na_2MnFe(CN)_6$, Dr. Goodenough's group used a high concentration of NaCl in the reaction solution in order to compete with water in occupying the interstitial positions and increase the capacity of the produced $Na_2MnFe(CN)_6$. Even so, only 118 mAh/g at a current of 12 mA/g was achieved [4]. Very recently, Berlin Green with a framework of $FeFe(CN)_6$ was reported as the cathode material in sodium-ion batteries [11]. The material delivered a capacity of ~115 mAh/g at a current of 120 mA/g. Noteworthy is the fact that the value was much smaller than its theoretical capacity of 200 mAh/g. The low capacity of Berlin Green can he attributed to the small $Fe^{3+}$-ions interacting with its interstitial spaces. The interstitial Fe-ions definitely reduce the available positions for sodium-ion intercalation and, thus, the capacity of Berlin Green.

It would be advantageous if a synthesis process existed to increase the number of "A" metal-ions in the interstitial sites of MCM materials.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48(2012)6544-6546.

[4] L. Wang, Y. Lu, J. Liu, M. Xu, J. Cheng, D. Zhang, J. B. Goodenough, A superior low-cost cathode for a Na-ion battery, Angew. Chem. Int. Ed., 52(2013)1964-1967.

[5] A. Eftekhari, Potassium secondary cell based on Prussian blue cathode, J. Power Sources, 126 (2004) 221-228.

[6] C. D. Wessells, R. A. Huggins, Y. Cui, Copper hexacyanoferrate battery electrodes with long cycle life and high power, Nature Communication, 2(2011) 550.

[7] C. D. Wessells, S. V. Peddada, R. A. Huggins, Y. Cui, Nickel hexacyanoferrate nanoparticle electrodes for aqueous sodium and potassium ion batteries. Nano Letter, 11(2011) 5421-5425.

[8] C. D. Wessells, S. V. Peddada, M. T. McDowell, R. A. Huggins, Y. Cui, The effect of insertion species on nano-structured open framework hexacyanoferrate battery electrode, J. Electrochem. Soc., 159(2012) A98-A103.

[9] T. Matsuda, M. Takachi, Y. Moritomo, A sodium manganese ferrocyanide thin film for Na-ion batteries, Chemical Communications, DOI: 10.1039/C3CC38839E.

[10] S.H. Yu, M. Shokouhimehr, T. Hyeon, Y.E. Sung, Iron hexacyanoferrate nanoparticles as cathode materials for lithium and sodium rechargeable batteries, ECS Electrochemistry Letters, 2(2013)A39-A41.

[11] X. Wu, W. Den, J. Qian, Y. Cao, X. Ai, H. Yang, Single-crystal $FeFe(CN)_6$ nanoparticles: a high capacity and high rate cathode for Na-ion batteries, J. Mater. Chem. A., 1(2013)10130-10134.

SUMMARY OF THE INVENTION

Disclosed herein are synthesis methods to obtain metal cyanometallates (MCTVIs) with higher capacities for use as electrode materials in metal-ion batteries. Herein, the MCM materials can be expressed as $A_NM1_PM2_Q(CN_R.FH_2O$, or in some aspects, $M1[M2_S(CN)_G]_{1/T}.DH_2O$. "A" is selected from a group of metals that include alkali and alkaline earth metals. M1 and M2 are independently selected from a group of metals that includes transition metals. The synthesis methods increase the available interstitial positions for the A-ions intercalation of the MCM compounds and improve their capacities in metal-ion batteries.

In one process, the materials are synthesized with a first solution (Solution 1) containing $M2_m(CN)_z{}^-$-ions and Solution 2 containing $M1_n{}^{b+}$-ions. To synthesize $A_NM1_PM2_Q(CN)_R \cdot FH_2O$, where N>0, a high concentration of "A"-ions is included in Solution 1, Solution 2, including excess $M1_n{}^{b+}$-ions, is added dropwise into Solution 1. In contrast to the reported synthesis processes for MCM compounds, the method disclosed herein may use an elevated temperature (30-100° C.) and organic solvents.

More explicitly, the method provides a first solution of $A_xM2_Y(CN)_Z$;
where "A" is selected from a first group of metals including alkali and alkaline earth metals;
where M2 is selected from a second group of metals including transition metals;
where x is in the range of 0 to 10;
where Y is in the range of 1 to 10; and,
where z is in the range of 1 to 10.

The method dropwise adds a second solution including M1 to the first solution, where MI is selected from the second group of metals. Typically, the process is conducted in an inert gas environment, at a temperature is in the range of 20 to 100 degrees Centigrade (C). As a result, a precipitate is formed of $A_NM1_PM2_Q(CN)_R \cdot FH_2O$;
where N is in the range of 1 to 4;
where P is less than or equal to 2;
where F is in the range of 0 to 20;
where Q is less than or equal to 2; and,
where R is less than or equal to 6.

Typically, the precipitate is dried in a vacuum environment including an inert gas, at a temperature in a range between 0 and 200 degrees C. In one aspect, prior to adding the second solution to the first solution, an organic solvent may he added to the first solution, the second solution, or both the first and second solutions. In another aspect prior to adding the second solution to the first solution, a reducing agent is added to the first solution, and second solution, or both the first and second solutions.

A second method for synthesizing MCM provides a first solution of $M_2C(CN)_B$;
where M2 is selected from a group of metals including transition metals;
where C is in a range of 1 to 10; and,
where B is in a range of 1 to 10.

The second method dropwise adds the first solution to a second solution including M1, where M1 is selected from the group of metals. As a result, a precipitate is formed of $M1[M2_S(CN)_G]_{1/T} \cdot DH_2O$;
where S/T is greater than or equal to 0.8;
where D is in a range of 0 to 20; and,
where G is less than or equal to 6.

Additional details of the above-described synthesis methods, as well as MCM materials with a low number of vacancies, are presented. below.

DETAILED DESCRIPTION

Figure 1:
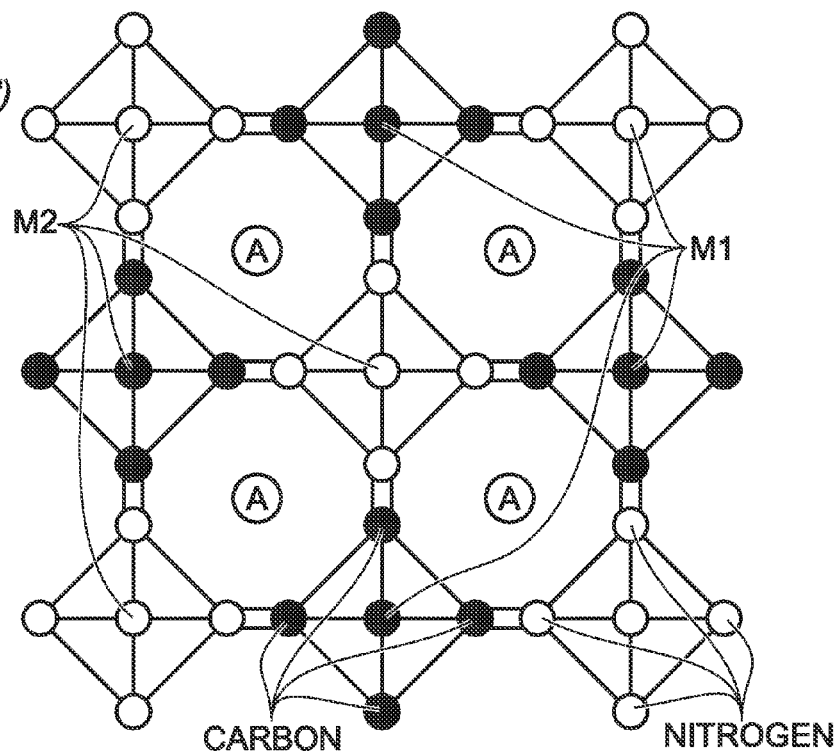
FIG. 1 is a schematic diagram of the framework of ideal $A_xM_1M_2(CN)_z$ (prior art).

Returning to FIG. 1, the schematic diagram can be used to represent a metal cyanometallate (MCM) with the formula of $A_NM1_PM2_Q(CN)_R \cdot FH_2O$, with the exception that the interstitial spaces, shown as filled with "A" metal elements in the ideal case, are not necessarily completely filled. In the formula the variables are as follows:
A is metal selected from a first group of metals including alkali and alkaline earth metals;
M1 and M2 are independently selected (M1 and M2 may be the same or a different metal) from a second group of metals including transition metals;
N is in the range of 1 to 4;
P is less than or equal to 2;
F is in the range of 0 to 20;
Q is less than or equal to 2; and,
R is less than or equal to 6.

This MCM material is unique in that the value of N is larger than any other known, non-theoretical MCM material. Details concerning the synthesis of this MCM are presented in detail below.

Figure 2:
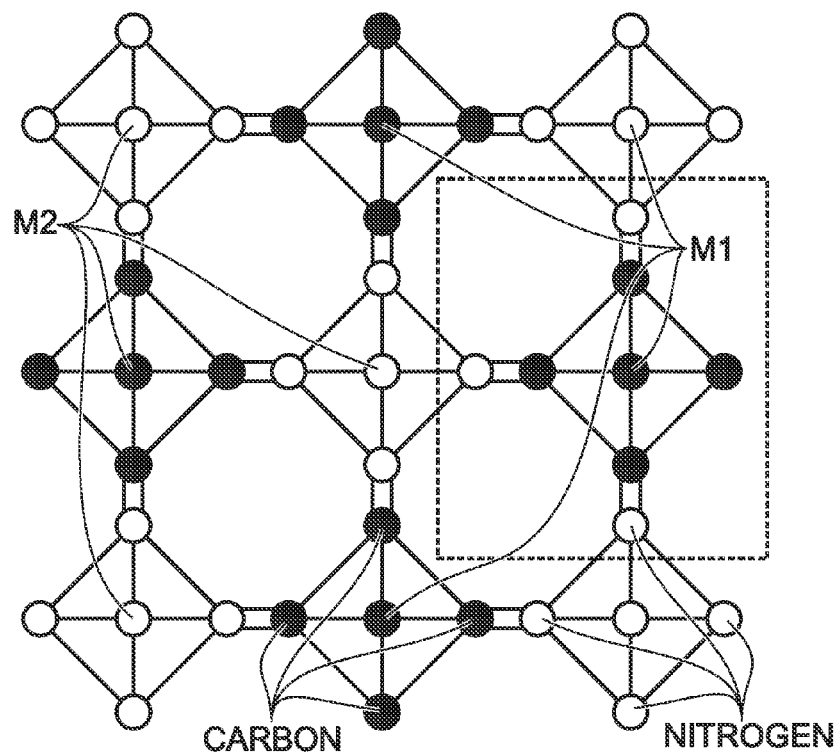
FIG. 2 is a schematic diagram of a MCM with the formula of $M1[M2_S(CN)_G]_{1/T} \cdot H_2O$.

FIG. 2 is a schematic diagram of a MCM with the formula of $M1[M2_S(CN)_G]_{1/T} \cdot DH_2O$. This figure is similar to the ideal MCM representation of FIG. 1, except that that some or all of the elements enclosed by the dotted line may be vacant. The variables in the formula are as follows:
M1 and M2 are independently selected from a group of metals including transition metals;
S/T is greater than or equal to 0.8;
D is in the range of 0 to 20; and,
G is less than or equal to 6.

This MCM material is unique in that the value of Q/P is larger than any other known, non-theoretical MCM imaterial. Details concerning the synthesis of this MCM are presented in detail below.

Regarding the notation: Prussian Blue is conventionally represented as $Fe_4[Fe(CN)_6]_3$. However, this formula does not accurately reflect the crystal structure that is conventionally obtained. Conventional Prussian Blue is more accurately represented with the formula of $Fe[Fe(CN)_6]_{3/4}$ in which there are 0.25 vacancies of $Fe(CN)_6$. The MCM materials described herein have fewer vacancies than conventional materials, To that end, the formula $M1[M2_S(CN)_G]_{1/T}$ is used, where S/T is at least 0.8, meaning there are less than 0.2 M2 vacancies per $M1[M2_S(CN)_G]_{1/T}$ molecule.

In general, a precipitation method is used to synthesize MCM materials as electrodes. Briefly, a solution including excess M1-ions reacts with the $A_xM1_Y(CN)_Z$ solution to form $A_NM1_PM2_Q(CN)_R \cdot Fh_2O$. However, under some circumstances, the sizes of metal--ions with high valences are very small, so it is most likely that the excess M1-ions occupy the interstitial space of $M_1M_2(CN)_R$ to reduce its capability of containing alkaline or alkali-ions during charge/discharge in metal-ion batteries.

The conventional precipitation method for synthesizing Berlin Green uses a solution including excess $Fe^{3+}$ ions to react with a $Fe(CN)_6{}^{3-}$ solution to form $FeFe(CN)_6$. However, since the size of $Fe^{3+}$-ions is even smaller than $Li^+$ and Na$^+$-ions, it is likely that the excess Fe$^{3+}$-ions occupy the interstitial space of FeFe(CN)$_6$ to reduce its capability of containing sodium-ions during charge/discharge in sodium-ion batteries.

As an improvement over the conventional synthesis method, one process described herein creates M1M2(CN)$_R$ materials with a solution containing excess M2$_Y$(CN)$_Z$-ions and a solution containing M1-ions. The solution containing the M1-ions is added dropwise into the solution containing the excess M2$_Y$(CN)$_Z$-ions to form M1M2(CN)$_R$. As soon as the solution containing the M1-ions drops into the solution containing the M2$_Y$(CN)$_Z$-ions, M1-ions are coordinated with M2$_Y$(CN)$_Z$-ions so that just a very few M1-ions occupy the interstitial space of M1M2(CN)$_R$. The solution (Solution 1) of M2$_Y$(CN)$_Z$-ions, with a concentration of 0.001 moles (M) to 2 M mixes with the solution (Solution 2) containing M1-ions having a concentration of 0.001 M-10 M. Typically, the ratio of M2$_Y$(CN)$_Z$-ions to M1-ions in moles is larger than 1. The reaction temperature is usually between 20° C. and 100° C., and Solution 2 is dropped into Solution 1. The final product can be washed with water and acetone several times, and dried between 20° C. and 150° C. under air or vacuum conditions.

The synthesis of Berlin Green (BG, FeFe(CN)$_6$) is given here as an example. Two BG samples were synthesized with the conventional process described above (designated BG-1) and the method disclosed herein (designated BG-2). In the conventional process [11], Solution 1 was a 0.1 M K$_3$Fe(CN)$_6$ water solution. Solution 2 was a 0.1 M FeCl$_3$ water solution. Solution 1 was dropped into Solution 2 slowly to form the precipitate BG-1. The volume of Solution 2 was as twice as that of Solution 1. In other words, Fe$^{3+}$-ions were in excess in the reaction. In the method disclosed herein, the same molarities of Solutions 1 and 2 were used, but there were other differences. One difference was that the volume of Solution 1 was more than that of Solution 2. The other was that Solution 2 was added dropwise into Solution 1 to obtain BG-2. As used herein, "dropwise added" means that the solution was added in a controlled, step-by step manner. In other words, Solution 2 was not added to Solution 1 in a single step. After being separated, washed, and dried, BG-1 and BG-2 were used as electrodes in sodium-ion batteries with an electrolyte of saturated NaClO$_4$ ethylene carbonate/diethylene carbonate (EC/DEC).

Figure 3:
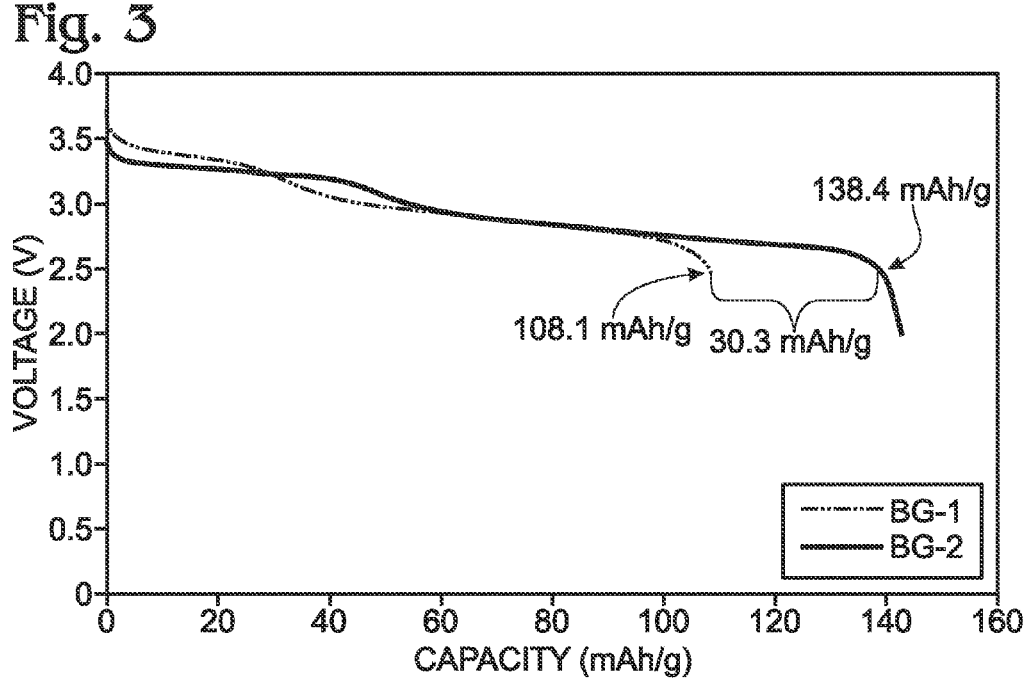
FIG. 3 is a graph comparing the capacities of the BG-1 and BG-2 samples.

FIG. 3 is a graph comparing the capacities of the BG-1 and BG-2 samples. With a current of 100 mA/g, the capacity at the first discharge of BG-2 was 30 mAh/g higher than that of BG-1. The method disclosed herein greatly improves the capacity of a Berlin Green electrode in a sodium-ion battery.

Figure 4:
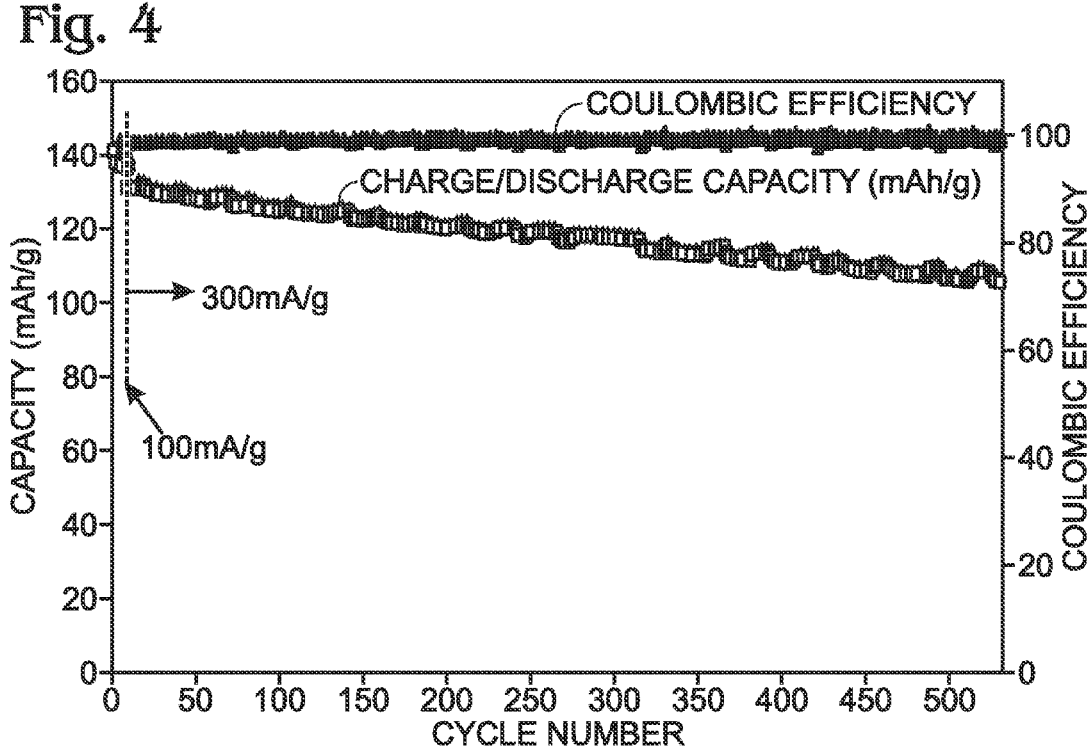
FIG. 4 is a graph depicting the cycling performance of the BG-2 Berlin Green electrode obtained from the synthesis method disclosed herein.

FIG. 4 is a graph depicting the cycling performance of the BG-2 Berlin Green electrode obtained from the synthesis method disclosed herein. In the first nine cycles, the capacity of Berlin Green stabilized at 137.7 mAh/g with the charge/discharge current of 100 mAh/g. In the 10$^{th}$ cycle, the current was changed/discharged to 300 mA/g. After 520 cycles, greater than 80% of the capacity was still retained.

Figure 5:
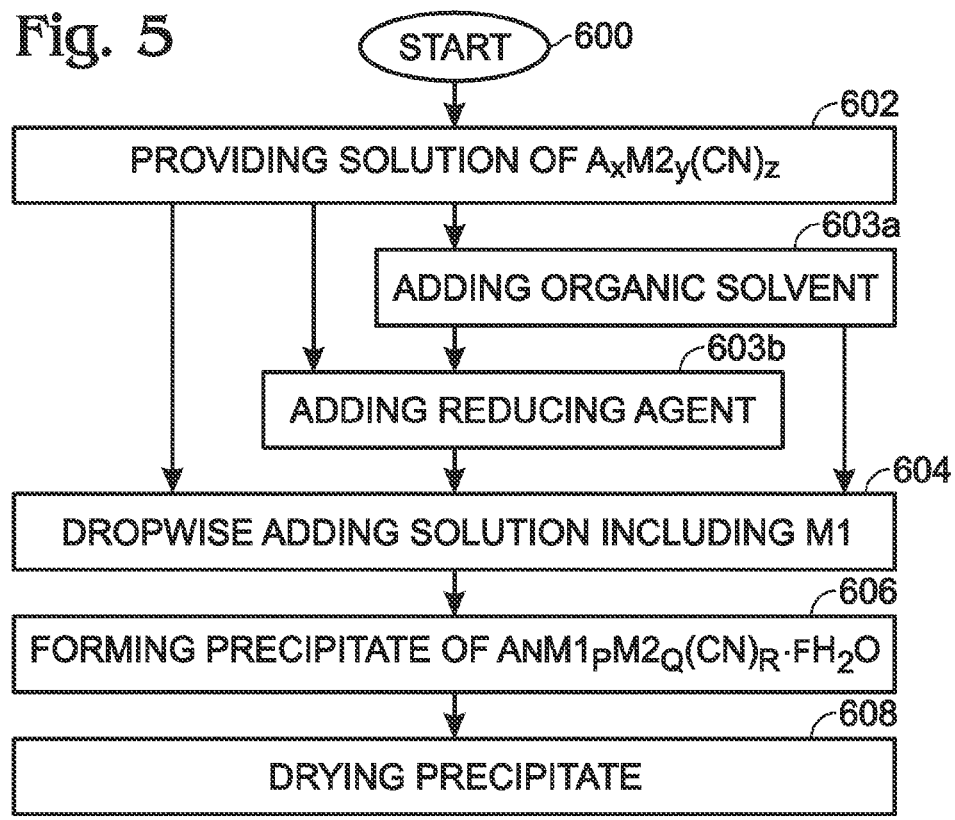
FIG. 5 is a flowchart illustrating a method for synthesizing metal cyanometallate (MCM).

FIG. 5 is a flowchart illustrating a method for synthesizing metal cyanometallate (MCM). Although the method is depicted as a sequence of numbered steps for clarity, the numbering does not necessarily dictate the order of the steps. It should be understood that some of these steps, where noted, may be skipped, performed in parallel, or performed without the requirement of maintaining a strict order of sequence. Generally however, the method follows the numeric order of the depicted steps. The method starts at Step 600.

Step 602 provides a first solution of A$_X$M2$_Y$(CN)$_Z$;
 where "A" is selected from a first group of metals including alkali and alkaline earth metals;
 where M2 is selected from a second group of metals including transition metals;
 where x is in the range of 0 to 10;
 where Y is in the range of 1 to 10; and,
 where Z is in the range of 1 to 10.

More explicitly, the first group of metals includes lithium (Li), sodium (Na), potassium (K), rubidium (Rh), cesium (Cs), calcium (Ca), strontium (Sr), barium (Ba), silver (Ag), aluminum (Al), magnesium (Mg), and combinations thereof. M1 and M2 are each independently selected from the second group of metals, which includes titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), and barium (Ba). As used herein, "independently selected" means that M1 and M2 may be the same or different types of metal.

Step 604 dropwise adds a second solution including M1 to the first solution, where M1 is selected from the second group of metals. Step 606 forms a precipitate of A$_N$M1$_P$M2$_Q$(CN)$_R$·FH$_2$O;
 where N is in the range of 1 to 4;
 where P is less than or equal to 2;
 where F is in the range of 0 to 20;
 where Q is less than or equal to 2; and,
 where R is less than or equal to 6.

In one aspect, the molar ratio of A$_X$M2$_Y$(CN)$_Z$ in the first solution is less than M1 in the second solution. Typically, Steps 602 through 606 are performed in a process environment having a temperature in a range of 20 to 100 degrees Centigrade (C). It is also typical that Step 604 is performed in an inert gas process environment. Step 608 dries the precipitate in a vacuum environment including an inert gas, at a temperature in the range between 0 and 200 degrees C.

In one aspect, prior to Step 604, Step 603a adds an organic solvent to the first solution, the second solution, or both the first and second solutions. Some examples of organic solvents include alcohol (e.g. methanol, ethanol, isopropyl alcohol), acetone, acetonitrile, and ether.

In another aspect, prior to the performance of Step 604, Step 603b adds a reducing agent to the first solution, second solution, or both the first and second solutions. Some examples of reducing agents include sodium borohydride, sodium hyposulfite, sodium sulfite, ascorbic acid, glucose, and polyvinylpyrrolidon. Note: this is not an exhaustive list of organic solvents or reducing agents that might be used. In some aspect, both Steps 603a and 603b are performed.

Figure 6:
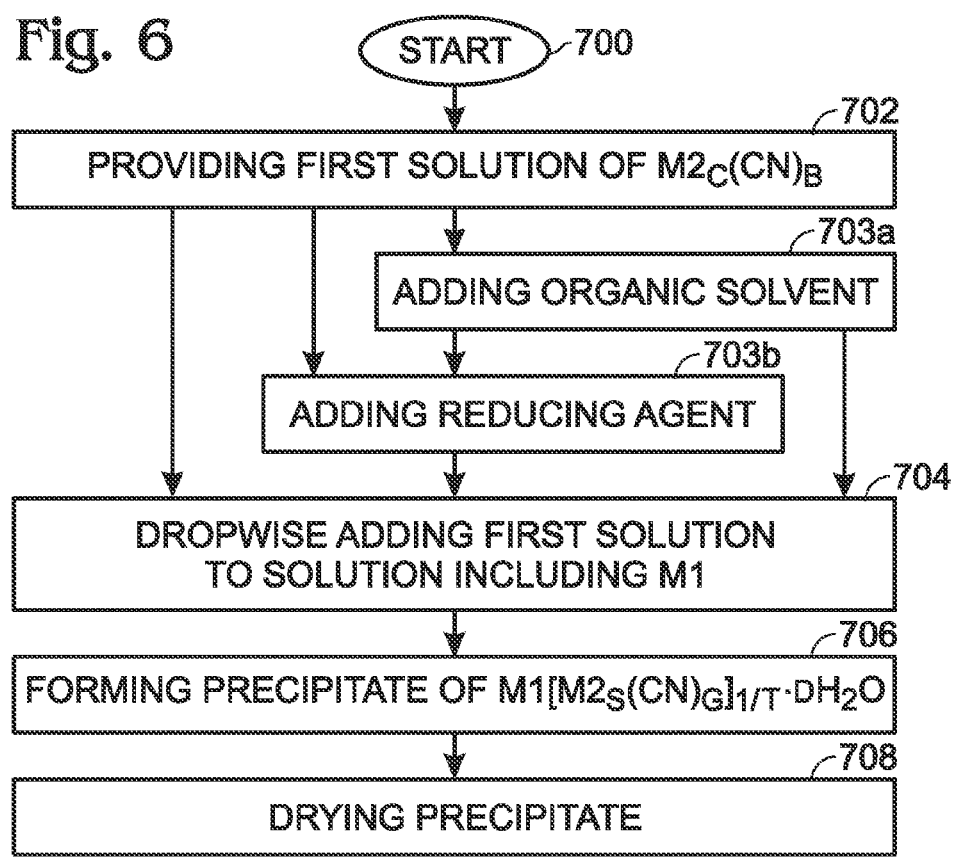
FIG. 6 is a flowchart illustrating a second method for synthesizing MCM.

FIG. 6 is a flowchart illustrating a second method for synthesizing MCM. The method begins at Step 700. Step 702 provides a first solution of M2$_C$(CN)$_B$;
 where M2 is selected from a group of metals including transition metals;
 where C is in the range of 1 to 10; and,
 where B is in the range of 1 to 10.

M1 and M2 are each independently selected from the group of metals that includes Ti, V, Cr, Mn, Fe, Co, Ni, Cu, Zn, Nb, Ru, Sn, In, Cd, Ca, Mg, Sr, and Ba. Step 704 dropwise adds the first solution to a second solution including M1, where M1 is selected from the group of metals. Step 706 forms a precipitate of M1[M2$_S$(CN)$_G$]$_{1/T}$·DH$_2$O;
 where S/T is greater than or equal to 0.8;
 where D is in the range of 0 to 20; and,
 where G is less than or equal to 6.

Step 708 dries the precipitate in a vacuum environment including an inert gas, at a temperature in the range between 0 and 200 degrees C.

In one aspect, the molar ratio of $M2_C(CN)_B$ in the first solution is greater than M1 in the second solution. Typically, Steps 702 through 706 are performed in a process environment having a temperature in a range of 20 to 100 degrees C. It is also typical that Step 704 is performed in an inert gas process environment.

In one aspect, prior to Step 704, Step 703a adds an organic solvent to the first solution, the second solution, or both the first and second solutions. Some examples of organic solvents include alcohol (e.g. methanol, ethanol, isopropyl alcohol), acetone, acetonitrile, and ether.

In another aspect, prior to the performance of Step 704, Step 703b adds a reducing agent to the first solution, second solution, or both the first and second solutions. Some examples of reducing agents include sodium borohydride, sodium hyposulfite, sodium sulfite, ascorbic acid, glucose, and poly-vinylpyrrolidon. Note: this is not an exhaustive list of organic solvents or reducing agents that might he used.

Processes for the synthesis of MCM have been provided. Examples of particular materials and process details have been presented to illustrate the invention. However, the invention is not limited to merely these examples. Other variations and embodiments of the invention will occur to those skilled in the art.

We claim:

1. A method for synthesizing metal cyanometallate (MGM), the method comprising;
   providing a first solution of $A_xM2_y(CN)_z$;
      where A is selected from a first group of metals including alkali metals, alkaline earth metals, silver (Ag) and aluminum (Al)
      where M2 is selected from a second group of metals including transition metals, tin (Sn), indium (In), calcium (Ca), magnesium (Mg), strontium (Sr), and barium (Ba)
      where X is in a range of 0 to 10;
      where Y is in a range of 1 to 10;
      where Z is in a range of 1 to 10;
   dropwise adding a second solution including M1 to the first solution;
      where M1 is selected from the second group of metals;
   forming a precipitate of $A_NM1_PM2_Q(CN)_R.FH_2O$;
      where N is in a range of 1 to 4;
      where P is less than or equal to 2;
      where F is in a range of 0 to 20;
      where Q is less than or equal to 2; and,
      where R is less than or equal to 6.

2. The method of claim 1 wherein dropwise adding the second solution including M1 to the first solution includes providing a process environment having a temperature in a range of 20 to 100 degrees Centigrade (C).

3. The method of claim 1 further comprising:
   prior to dropwise adding the second solution to the first solution, adding an organic solvent to a solution selected from the group consisting of the first solution, the second solution, and both the first and second solutions.

4. The method of claim 3 wherein adding the organic solvent includes adding an organic solvent selected from the group consisting of alcohol, acetone, acetonitrile, and ether.

5. The method of claim 1 further comprising:
   prior to dropwise adding the second solution to the first solution, adding a reducing agent to a solution selected from the group consisting of the first solution, the second solution, and both the first and second solutions.

6. The method of claim 5 wherein adding the reducing agent includes adding a reducing agent selected from the group consisting of sodium borohydride, sodium hyposulfite, sodium sulfite, ascorbic acid, glucose, and polyvinylpyrrolidon.

7. The method of claim 1 wherein dropwise adding the second solution to the first solution includes adding the second solution to the first solution in an inert gas process environment.

8. The method of claim 1 further comprising:
   drying the precipitate in a vacuum environment including an inert gas, at a temperature in a range between 0 and 200 degrees C.

9. The method of claim 1 wherein the first group of metals is selected from the group consisting of lithium (Li), sodium (Na), potassium (K), rubidium (Rh), cesium (Cs), calcium (Ca), strontium (Sr) barium (Ba), magnesium (Mg), and combinations thereof.

10. The method of claim 1 wherein M1 and M2 are each independently selected from the second group of metals consisting of titanium (Ti), vanadium (V), chromium (Cr), manganese (Mn), iron (Fe), cobalt (Co), nickel (Ni), copper (Cu), zinc (Zn), niobium (Nb), ruthenium (Ru), cadmium (Cd).

11. The method of claim 1 wherein the molar ratio of $A_xM2_y(CN)_z$ in the first solution is less than M1 in the second solution.

12. A method for synthesizing metal cyanometallate (MCM), the method comprising:
   providing a first solution of $M2_c CN)_B$;
      where M2 is selected from a group of metals including transition metals, tin (Sn), indium (In), calcium (Ca), magnesium (Mg), strontium (Sr), and barium (Ba)
      where C is in a range of 1 to 10;
      where B is in a range of 1 to 10;
   dropwise adding the first solution to a second solution including M1;
      where M1 is selected from the group of metals;
   forming a precipitate of $M1[M2_s(CN)_G]_{1/T}.DH_2O$;
      where S/T is greater than or equal to 0.8;
      where D is in a range of 0 to 20; and,
      where G is less than or equal to 6.

13. The method of claim 12 wherein dropwise adding the first solution to the second solution includes dropwise adding the first solution to the second solution in a process environment having a temperature in a range of 20 to 100 degrees Centigrade (C).

14. The method of claim 12 further comprising:
   prior to dropwise adding the first solution to the second solution, adding an organic solvent to a solution selected from the group consisting of the first solution, the second solution, and both the first and second solutions.

15. The method of claim 14 wherein adding the organic solvent includes adding an organic solvent selected from the group consisting of alcohol, acetone, acetonitrile, and ether.

16. The method of claim 12 further comprising:
   prior to dropwise adding the first solution to the second solution, adding a reducing agent to a solution selected from the group consisting of the first solution, and second solution, and both the first and second solutions.

17. The method of claim 16 wherein adding the reducing agent includes adding a reducing agent selected from the group consisting of sodium borohydride, sodium hyposulfite, sodium sulfite, ascorbic acid, glucose, and polyvinylpyrrolidon.

18. The method of claim 12 further comprising:
drying the precipitate in a vacuum environment including an inert gas, at a temperature in a range between 0 and 200 degrees C.

19. The method of claim 12 wherein M1 and M2 are each independently selected from the group of metals consisting of titanium (Ti), vanadium (V), chromium (Cr), manganese (Mn), iron (Fe), cobalt (Co), nickel (Ni), copper (Cu), zinc (Zn), niobium (Nb), ruthenium (Ru), cadmium (Cd).

20. The method of claim 12 wherein the molar ratio of $M2_C(CN)_B$ in the first solution is greater than M1 in the second solution.

21. The method of claim 12 wherein dropwise adding the first solution into the second solution includes dropwise adding the first solution to the second solution in an inert gas process environment.

* * * * *